US00H002097H

(19) United States

(12) Statutory Invention Registration (10) Reg. No.: US H2097 H

Plichta (43) Published: Feb. 3, 2004

(54) ELECTROLYTE ADDITIVE TO STABILIZE LITHIUM ORGANIC ELECTROLYTES FOR LITHIUM ION CELLS

(75) Inventor: Edward J. Plichta, Howell, NJ (US)

(73) Assignee: The United States of America as represented by the Secretary of the Army, Washington, DC (US)

(21) Appl. No.: 09/018,496

(22) Filed: Feb. 4, 1998

(51) Int. Cl.[7] ..... H01M 6/16

(52) U.S. Cl. ..... 429/332; 429/326; 429/330; 429/331; 429/188

(58) Field of Search ..... 429/326, 330, 429/331, 332, 188

(56) References Cited

U.S. PATENT DOCUMENTS 4,957,833 A * 9/1990 Daifuku et al. ..... 429/332
5,422,203 A * 6/1995 Guyomard et al. ..... 429/332
5,487,960 A * 1/1996 Tanaka ..... 429/332
5,525,443 A * 6/1996 Okuno et al. ..... 429/332

* cited by examiner

*Primary Examiner*—Michael J. Carone
*Assistant Examiner*—Aileen B. Felton
(74) *Attorney, Agent, or Firm*—Michael Zelenka; George B. Tereschuk

(57) ABSTRACT

A salt additive to lithium conducting organic electrolytes which thermally stabilizes the solution and more particular to provide improved cell operation and storage of lithium ion cells at elevated temperatures is $LiBF_4$ and is employed in a salt molar ratio of at least about 1:1.

16 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

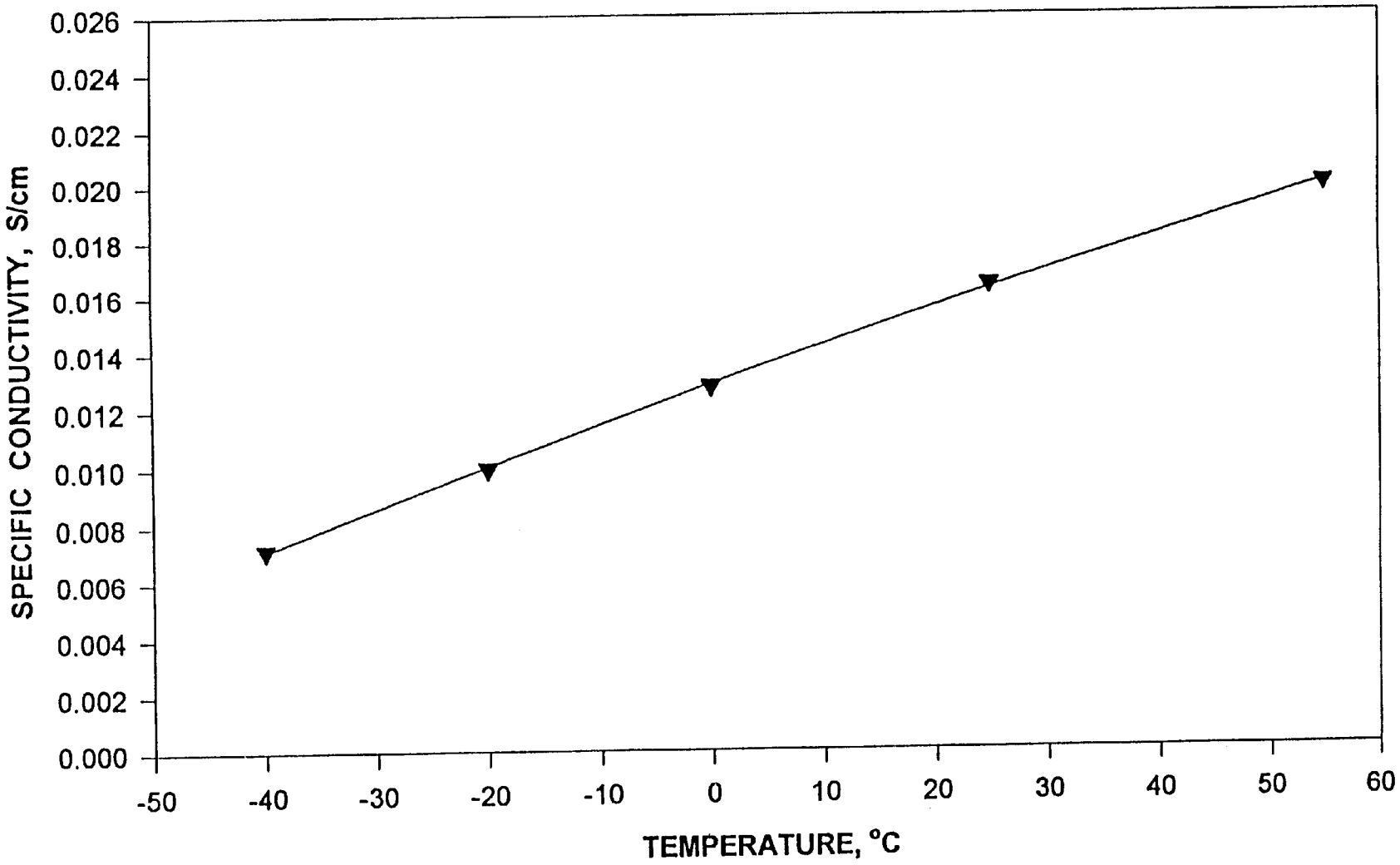
SPECIFIC CONDUCTIVITY, S/cm
0.026
0.024
0.022
0.020
0.018
0.016
0.014
0.012
0.010
0.008
0.006
0.004
0.002
0.000
-50
-40
-30
-20
-10
0
10
20
30
40
50
60
TEMPERATURE, °C

ELECTROLYTE ADDITIVE TO STABILIZE LITHIUM ORGANIC ELECTROLYTES FOR LITHIUM ION CELLS

GOVERNMENT INTEREST

The invention described herein may be manufactured, used, and licensed by or for the Government for governmental purposes without the payment to me of any royalty thereon.

FIELD OF INVENTION

This invention relates in general to electrochemical cells and in particular to rechargeable lithium-ion cells. Such cells include a lithium intercalating anode, a lithium intercalating cathode and a lithium ion conducting salt dissolved in an organic solvent or mixed solvent solution.

BACKGROUND OF INVENTION

An electrolyte additive was discovered which when added to lithium ion organic electrolytes was found to provide thermal stability to the electrolyte. Lithium ion conducting electrolytes generally contain lithium salts such as lithium hexaflurophosphate ($LiPF_6$), lithium hexafluroarsenate ($LiAsF_6$), and lithium perchlorate ($LiClO_4$) which, when dissolved into organic solvents such as esters, cyclic esters, and dialkyl-carbonates, form Lewis acid solutions. In addition, trace water is always present in these solvents. The water can hydrolyze the ester solvents in the presence of Lewis acids into organic acids and alcohols resulting in rapid electrolyte decomposition and degradation of cell performance when used in lithium ion cells. The catalyst for this hydrolysis is the acidity of the organic electrolyte, and the rate of reaction is accelerated at elevated temperatures. Lithium ion cells are expected to be used over wide temperature ranges from +40° C. Go 60° C. and require stable storage to temperatures as high as 90° C. Highly conductive organic electrolyte solutions containing for instance $LiPF_6$ are known to rapidly decompose from hydrolysis at about 70° C. which limits its practical use in cells. If the Lewis acid solutions such as those containing $LiPF_6$ could be stabilized from thermal decomposition, the solutions would be better suited for use in practical lithium ion batteries.

The general object of the invention is to provide a salt additive to lithium conducting organic electrolytes which thermally stabilizes the solution and more particular to provide improved cell operation and storage of lithium ion cells at elevated temperatures.

SUMMARY OF THE INVENTION

It has now been found that these objects outlined above can be met by using $LiBF_4$ as an additive to lithium conducting organic electrolytes in a salt molar ratio of at least 1:1. In a preferred embodiment, it was found that additions of lithium tetrafluroborate ($LiBF_4$) in at least a 1 to 1 molar ratio to $LiPF_6$ in a mixed solvent solution containing ethylene carbonate, propylene carbonate, dimethyl carbonate, and methyl formate in a 1:1:3:15 volume ratio, respectively, resulted in a solution which is thermally stable at a temperature of 71° C. over those solutions containing less $LiBF_4$ or only $LiPF_6$.

BRIEF DESCRIPTION OF THE DRAWINGS

The sole FIGURE shows conductivity as a function of temperature.

DETAILED DESCRIPTION OF THE DRAWINGS

With the exception of the additive of the invention, the lithium electrochemical cells are conventional. Thus, any of the known electrodes for such cells can also be used in the present invention. The electrolyte of these cells is one or more dissociable lithium salts dissolved in one or more organic solvents. The lithium salt can be, for example, $LiPF_6$, $LiAsF_6$, $LiClO_4$, $LiAlCl_4$, $LiN(CF_3S0_2)_2$ and/or $LiC(CF_3SO_2)_3$ and the organic solvent can be, for instance, propylene carbonate, ethylene carbonate, gamma butyrolactone, methyl formate, dimethyl carbonate and diethyl carbonate and the like.

In accordance with the present invention, $LiBF_4$ is additionally employed in the electrolyte in a stabilizing amount of at least about 1 more per mole of the other lithium salt(s) present. A preferred embodiment of the invention employs $LiPF_4$ as the lithium electrolyte salt and a mixture of ethylene carbonate, propylene carbonate, dimethyl carbonate and methyl formate in a volume ratio of about 1:1:3:15 as the organic solvent.

The advantages of the invention was demonstrated as follows. Commercially available battery grade anhydrous salts of $LiPF_6$ and $LiBF_4$, and the organic solvents ethylene carbonate (EC), propylene carbonate (PC), dimethyl carbonate (DMC) and methyl formate (MF) of battery grade purity were used. For the determination of electrolyte thermal stability, the electrolyte solutions set forth in Table 1 below were prepared in an argon filled dry box (<1 ppm water in box atmosphere) and sealed in glass pressure vials affixed with Teflon screw caps. The vials were placed into an environmental chamber which was maintained at 71° C. and were observed for any color changes which are associated with electrolyte decomposition. All solutions were initially clear with no insoluble products visible. Table 1 depicts the results for the thermal storage of the lithium ion conducting electrolytes at 71° C. for one week. The solution concentrations are given in molal units.

TABLE 1

| Electrolyte | Days @ 71° C. | Observations |
|---|---|---|
| 1.7 m $LiPF_6$ in 1:1:3:15 (volume ratio) EC:PC:DMC:MF | 0 | clear solution |
| | 2 | pale yellow solution |
| | 5 | yellow solution |
| | 7 | deep yellow solution |
| 1.9 m (1:9 mole ratio of $LiBF_4$ to $LiPF_6$) in 1:1:3:15 (volume ratio) EC:PC:DMC:MF | 0 | clear solution |
| | 3 | yellow solution |
| | 5 | yellow solution |
| | 7 | deep yellow solution |
| 1 m (1:1 mole ratio $LiBF_4$ to $LiPF_6$) in 1:1:3:15 (volume ratio) EC:PC:DMC:MF | 0 | clear solution |
| | 2 | clear solution |
| | 5 | clear solution |
| | 7 | clear solution |

The results show that the solution containing $LiBF_4$ in a 1 to 1 molar ratio to $LiPF_6$ exhibited no color change over either the solution which contained less $LiBF_4$ or the solution containing only $LiPF_6$.

Without being limited to theory, the color change observed for the solutions is believed to be due to the following hydrolysis reaction:

(I)

$$\underset{\text{ester}}{RCOOR'} + \underset{\text{water}}{H_2O} \xrightarrow{\text{Lewis Acid}} \underset{\text{organic acid}}{RCOOH} + \underset{\text{alcohol}}{R'OH}$$

where the reaction is catalyzed in the presence of a Lewis acid. The products formed from reaction (I) then can undergo dehydration reactions as follows to form additional water which accelerates the further decomposition of the electrolyte:

(II)

$$\underset{\text{alcohol}}{2R'OH} \longrightarrow \underset{\text{ether}}{R'OR} + \underset{\text{water}}{H_2O}$$

and (III)

$$\underset{\text{organic acid}}{RCOOH} \longrightarrow \underset{\text{carbon monoxide + water}}{CO + H_2O}$$

$LiPF_6$ forms Lewis acid solutions in organic solvents and it was found that the addition of $LiBF_4$ was able to hinder the hydrolysis reaction (I) at elevated temperatures. In addition, it was found that less than the about 1:1 molar ratio of $LiBF_4$ in the electrolyte did not result in any improvement in thermal stability.

The conductivity as a function of temperature for the 1 M (1:1 mole ratio of $LiBF_4$ to $LiPF_6$) in 1:1:3:15 volume ratio of EC:PC:DMC:MF was measured and is presented in FIG. 1. It can be seen that the electrolyte has excellent conductivity over a wide temperature range in addition to being thermally stable, making it an excellent choice for use in practical lithium ion cells.

It will be understood that those specialized in the art of lithium ion batteries that one could use the $LiBF_4$ addition to other electrolyte solutions containing various salts and solvents provided they maintain at least about a 1:1 mole ratio of the $LiBF_4$ to the other lithium salt(s) being used.

Various changes and modifications can be made without departing from the spirit and scope of the present invention. The several embodiments set forth were for the purpose of illustrating the invention and were not intended to limit it.

What is claimed is:

1. An electrolyte electrochemical cells comprising an organic solvent solution having an organic solvent and at least two different lithium salts in which a first one of the lithium salts is $LiBF_4$ in an amount that is at least an about one to one mole ratio to a second one of the lithium salts present.

2. An electrolyte for electrochemical cells according to claim 1 wherein the second lithium salt present is selected from the group consisting of $LiPF_6$, $LiAsF_6$, $LiClO_4$, $LiAlCl_4$, $LiN(CF_3SO_2)_2$ and $LiC(CF_3SO_2)_3$.

3. An electrolyte for electrochemical cells according to claim 2 wherein the organic solvent is at least one member selected from the group consisting of propylene carbonate, ethylene carbonate, gamma butyrolactone, methyl formate, dimethyl carbonate and diethyl carbonate.

4. An electrolyte for electrochemical cells according to claim 1 wherein the organic solvent is at least one member selected from the group consisting of propylene carbonate, ethylene carbonate, gamma butyrolactone, methyl formate, dimethyl carbonate and diethyl carbonate.

5. An electrolyte for electrochemical cells according to claim 4 wherein the organic solvent is a mixture of ethylene carbonate, propylene carbonate, dimethyl carbonate and methyl formate.

6. An electrolyte for electrochemical cells according to claim 5 wherein the second lithium salt comprises $LiPF_6$.

7. An electrolyte for electrochemical cells according to claim 4 wherein the organic solvent is a mixture of ethylene carbonate, propylene carbonate, dimethyl carbonate and methyl formate in a volume ratio of 1:1:3:15, respectively.

8. An electrolyte for electrochemical cells according to claim 7 wherein the second lithium salt comprises $LiPF_6$.

9. An electrochemical cell comprising an anode, a cathode and an electrolyte, wherein said electrolyte comprises an organic solvent solution having an organic solvent and at least two different lithium salts in which a first one of the lithium salts is $LiBF_4$ in an amount that is at least an about one to one mole ratio to a second one of the lithium salts present;

10. An electrochemical cell according to claim 9 wherein the second lithium salt present is selected from the group consisting of $LiPF_6$, $LiAsF_6$, $LiClO_4$, $LiAlCl_4$, $LiN(CF_3SO_2)_2$ and $LiC(CF_3SO_2)_3$.

11. An electrochemical cell according to claim 10 wherein the organic solvent is at least one member selected from the group consisting of propylene carbonate, ethylene carbonate, gamma butyrolactone, methyl formate, dimethyl carbonate and diethyl carbonate.

12. An electrochemical cell according to claim 9 wherein the organic solvent is at least one member selected from the group consisting of propylene carbonate, ethylene carbonate, gamma butyrolactone, methyl formate, dimethyl carbonate and diethyl carbonate.

13. An electrochemical cell according to claim 12 wherein the organic solvent is a mixture of ethylene carbonate, propylene carbonate, dimethyl carbonate and methyl formate.

14. An electrochemical cell according to claim 13 wherein the second lithium salt comprises $LiPF_6$.

15. An electrochemical cell according to claim 12 wherein the organic solvent is a mixture of ethylene carbonate, propylene carbonate, dimethyl carbonate and methyl formate in a volume ratio of 1:1 :3:15, respectively.

16. An electrochemical cell according to claim 15 wherein the second lithium salt comprises $LiPF_6$.

* * * * *